United States Patent [19]

Jarrige-Lemas

[11] Patent Number: 5,155,920
[45] Date of Patent: Oct. 20, 1992

[54] DEVICE FOR DETECTING THE END OF A SLEEVE ARRANGED IN A TUBE, AND TOOL HOLDER HAVING SUCH A DEVICE

[75] Inventor: Claude Jarrige-Lemas, Lyon, France
[73] Assignee: Framatome, Courbevoie, France
[21] Appl. No.: 692,658
[22] Filed: Apr. 29, 1991

[30] Foreign Application Priority Data

Apr. 27, 1990 [FR] France ............................ 90 05442

[51] Int. Cl.$^5$ ................................................. G01B 7/12
[52] U.S. Cl. ........................................ 33/544; 33/502
[58] Field of Search .............. 33/502, 542, 544, 544.1, 33/544.2, 544.3, 544.6, 542.1, 555.1

[56] References Cited

U.S. PATENT DOCUMENTS

| | | | |
|---|---|---|---|
| 1,893,600 | 1/1933 | Shull | 33/544 X |
| 3,139,686 | 7/1964 | Brandon | 33/544.1 |
| 3,898,741 | 8/1975 | Casey . | |
| 4,235,020 | 11/1980 | Davis et al. | 33/544 |

FOREIGN PATENT DOCUMENTS

| | | |
|---|---|---|
| 1391176 | 1/1965 | France . |
| 2593421 | 7/1987 | France . |
| 2595439 | 9/1987 | France . |
| 1232835 | 4/1960 | Switzerland . |

Primary Examiner—Harry N. Haroian
Attorney, Agent, or Firm—Pollock, Vande Sande & Priddy

[57] ABSTRACT

The detection device comprises a support to be introduced concentrically into the tube, a feeler mounted on the support for movement between a position of rest in which it projects radially beyond the inner wall of the sleeve, and a position retracted inwards in relation to the wall, the feeler being resiliently biased towards its position of rest, and a sensor of the position of the feeler. The invention is used for fitting a tube of a steam generator of a pressurized-water nuclear reactor with a sleeve.

10 Claims, 2 Drawing Sheets

DEVICE FOR DETECTING THE END OF A SLEEVE ARRANGED IN A TUBE, AND TOOL HOLDER HAVING SUCH A DEVICE

FIELD OF THE INVENTION

The present invention relates to a device for detecting the end of a sleeve arranged in a tube. It is used particularly for fitting the tubes of steam generators of pressurized-water nuclear reactors with sleeves.

BACKGROUND OF THE INVENTION

In pressurized-water nuclear power stations, steam is produced by means of steam generators. These steam generators receive primary pressurized water at a high temperature obtained by circulating the primary water between the fuel elements placed in the vessel of the reactor.

The pressurized primary water circulates in a large number of heat-exchanger tubes of the steam generator. These U-shaped tubes have a small cross-section and a great length. When the preheated water of the secondary circuit comes into contact with the tubes, it evaporates to provide steam intended for feeding the turbines which will themselves cause the rotation of an alternator for generating electricity.

The heat-exchanger tubes of the steam generators form a highly sensitive point, and because of their small thickness they constitute functional reactor elements of major importance which have to be monitored constantly.

Thus, during refuelling shutdowns, these tubes are checked regularly to ensure that they are intact, because the leakage or breakage of one or more of them would require immediate shutdown of the reactor, in order to carry out the work and repairs necessary for putting the relevant tube or tubes out of action.

When faults exceeding the criteria of acceptability are detected in the tubes, it is necessary for them to be repaired. A method currently adopted involves covering the fault by means of a sleeve, so as to ensure sealing between the primary circuit and the secondary circuit and to allow the tube to continue to perform its funtion.

The sleeve is fastened by mechanical positioning (expansion) and then by introducing into the tube a welding tool holder comprising, for example, a laser welding appliance. It is therefore necessary to know the position of the end of the sleeve accurately so that the tool holder can be positioned correctly.

SUMMARY OF THE INVENTION

The object of the invention is to provide an economical device capable of determining the position of the sleeve.

For this purpose, the subject of invention is a device for detecting the end of a sleeve arranged in a tube, the device comprising:

a support suitable for being introduced concentrically into the tube;

a feeler mounted on the support for movement between a position of rest, in which it projects radially beyond the inner wall of the sleeve, and a position retracted inwards in relation to this wall;

means for biasing the feeler elastically towards its position of rest; and a sensor of the position of the feeler.

According to other characteristics of the invention:

in its position of rest, the feeler is recessed relative to the inner wall of the tube;

the feeler is a bulged elastic lamella, a first end of which is fastened to the support and the second end of which is moveable relative to the latter;

the sensor is a proximity detector mounted on the support opposite the second end of the lamella;

the sensor is a strain gauge associated with the first end of the lamella;

the feeler is a lever biased towards its position of rest by a spring;

the support carries at least two feelers arranged in different radial planes;

the support carriers at least two sensors associated with different feelers; and the feeler is an elastic ring mounted floating in its plane in parallel with the axis of the tube and surrounding a stop.

Another subject of the invention is a tool holder intended for fastening a sleeve in a tube, this tool holder having a detection device, as defined above, the support of which is fixed to the tool holder.

BRIEF DESCRIPTION OF THE DRAWINGS

Exemplary embodiments of the invention will now be described with reference to the accompanying drawings in which.

DESCRIPTION OF PREFERRED EMBODIMENT

Figure 1:
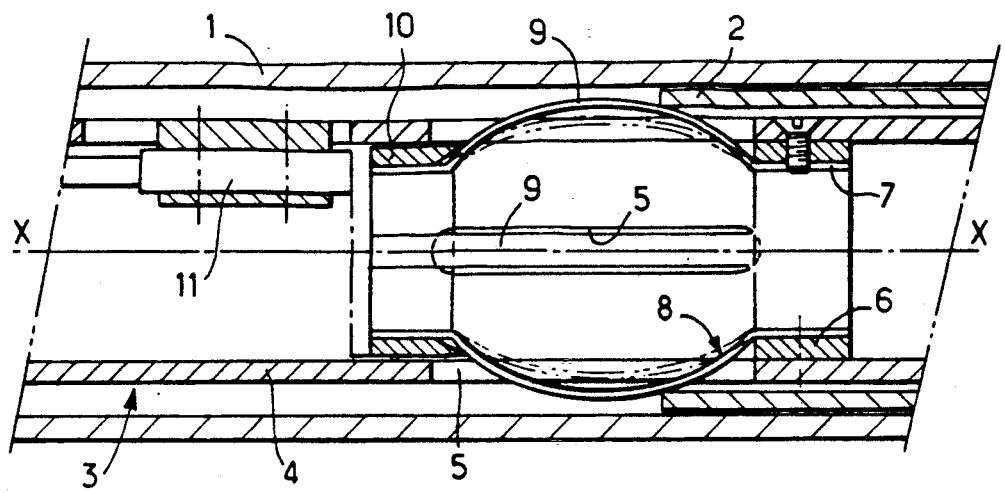
FIG. 1 is a view in longitudinal section of a sleeve detection device according to the invention.

FIG. 1 illustrates a steam-generator tube 1 which is to be repaired by covering its defective zone internally by means of a sleeve 2, only the upstream end of which can be seen in the drawing. This sleeve is assumed to have been pre-positioned in the tube by the expansion of its running part (not shown in the drawing).

In the present specification, the words "upstream" and "downstream" are meant to refer to the direction of introduction of the tool holder into the tube which is from left to right, as seen in FIGS. 1, 2, 4, 5 and 7.

To fasten the sleeve 2 sealingly in the tube, a tool holder 3 equipped with suitable centering means (not shown) is introduced concentrically into the tube 1. This tool holder, of which only the parts relating to the present invention have been shown, is equipped at its downstream end (not shown in the drawing) with a rotary welding head, for example a laser welding head. The problem is to position this welding head correctly in relation to the sleeve.

For this purpose, part of the tool holder forms a tubular support 4 having four longitudinal slots 5 arranged at 90° relative to one another about the axis X—X of the tube 1. A collar 6 is fastened in the support 4 just downstream of these slots, and the downstream end 7 of four elastic lamellae 8 is fastened to this collar.

Each lamella 8 has an outwardly convex form, its running part 9 passing freely through the associated slot 5. The upstream ends of the four lamellae are fastened to a collar 10 which can slide with a slight play in that part of the support 4 located just upstream of the slots 5.

The device also comprises a proximity detector 11 fastened in the support 4 at a short distance upstream of the collar 10 when the lamellae 9 are at rest.

As can be seen in FIG. 1, at rest the lamellae 9 are inscribed within a cylinder of which the diameter is slightly smaller than the inside diameter of the tube 1, but larger than that of the sleeve 2. When the tool holder advances in the tube and the welding head has almost reached its desired longitudinal position in the sleeve, the lamellae 9 butt against the upstream portion of the latter, forcing them to flatten somewhat towards the axis X—X.

Thus, since the downstream end of the lamellae is fixed to the tool holder, their upstream end moves in the upstream direction in relation to the latter, so that the collar 10 moves towards the proximity detector 11, as indicated by dot-and-dash lines in FIG. 1. This detector then emits a suitable signal which makes it possible to know the exact position of the welding head in relation to the sleeve.

It will be seen that the structure of the device automatically ensures centering of the tool holder in relation to the sleeve.

Figure 2:
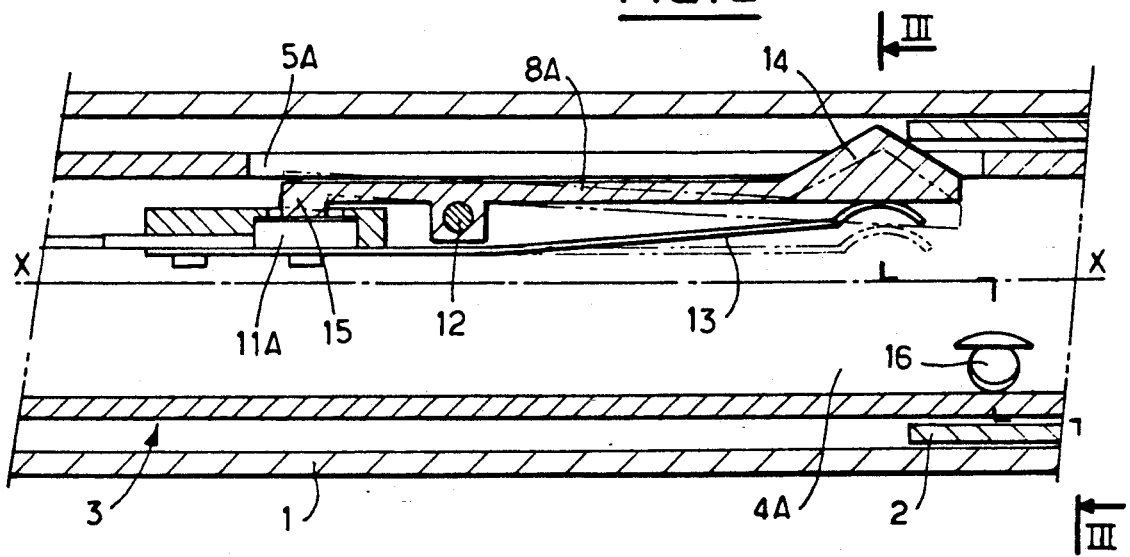
FIG. 2 is a similar view of another embodiment of the device according to the invention.
Figure 3:
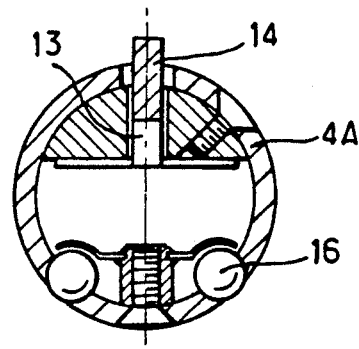
FIG. 3 is a view taken in a section along the broken line III—III of FIG. 2.

In the embodiment of FIG. 2, the lamellae 8 are replaced by a longitudinal lever 8A articualted at an intermediate point about a transverse axle 12 fixed to the support 4A. A spring 13 fastened to this support pulls the downstream end 14 of the lever 8A outwards through an aperture 5A of the support. This tilting is limited by the bearing of the upstream end 15 of the lever against a force sensor 11A fastened in the support 4A. The device also comprises two balls 16 for centering the support 4A in the sleeve 2. These balls are arranged in a transverse plane of the support located slightly downstream of the downstream end of the lever 8A at 120° relative to the latter (FIG. 3) and project slightly on the outer surface of the support.

At rest, the end 14 of the lever slightly projects radially beyond the outer wall of the sleeve. When the support 4A penetrates into the latter, the balls 16 bear on the inner surface of the sleeve and then the end 14 of the lever, the front face of which is convergent in the downstream direction, butts against the upstream end portion of the sleeve and is pushed by the latter towards the axis X—X, as indicated by dot-and-dash lines in FIG. 2. This movement detaches the upstream end 15 of the lever from the force sensor 11A, and the latter emits a corresponding signal.

In the embodiment of FIG. 4, there are, once again, two lamellae 8B similar to the lamellae 8 of FIG. 1. However, the downstream end of these lamellae has a cantilever upstream extension 17, and their upstream end bears freely on a cylindrical bearing surface 18 of the support 4B. When the running part 9 of the lamellae comes up against the upstream end portion of the sleeve, their flattening causes movement of their upstream ends in the upstream direction in relation to the support, as indicated by dot-and-dash lines in FIG. 4, and deformation of the extensions 17. This deformation is detected by two strain gauges 11B associated respectively with these two extensions and emitting a suitable signal.

The detection of the deformation of the two lamellae makes it possible to ensure that the emitted signal does not correspond to an unintended deformation of the wall of the tube 1. Furthermore, the strain gauges make it possible to carry out quantitative measurement of the deformation of the lamellae, and this can be useful information.

Figure 5:
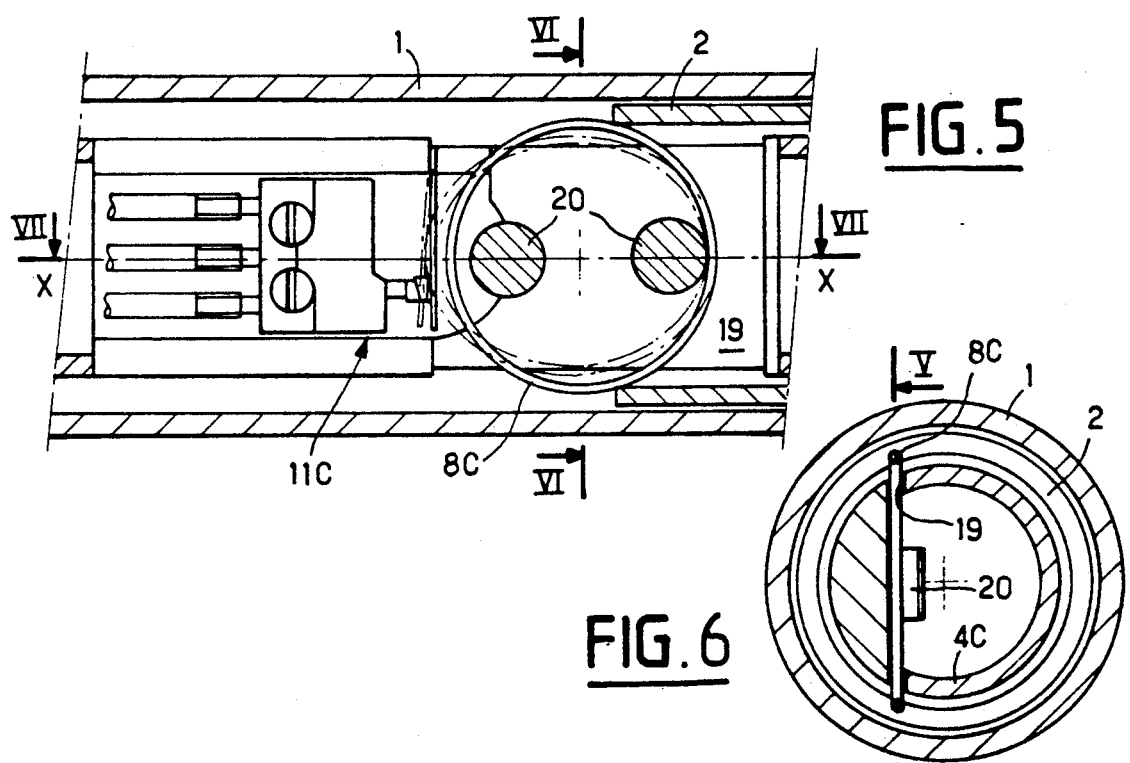
FIG. 5 is a view, taken in a section along the line V—V of FIG. 6, of a fourth embodiment of the device according to the invention.
Figure 6:
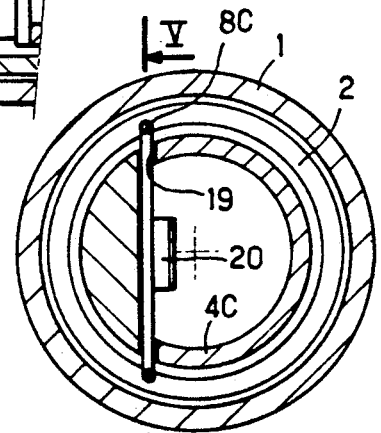
FIG. 6 is a view taken in a section along the line VI—VI of FIG. 5.
Figure 7:
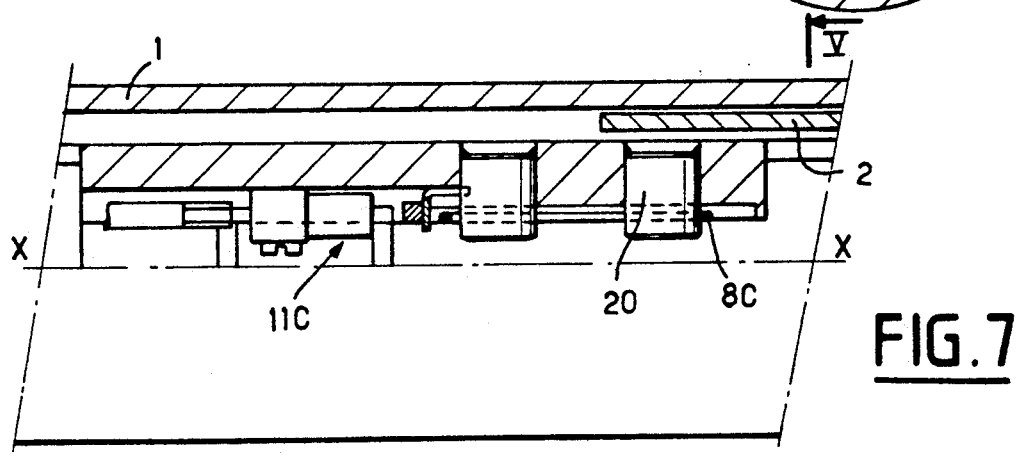
FIG. 7 is a view of which the upper half is a section taken along the line VII—VII of FIG. 5.

In the embodiment of FIGS. 5 to 7, a circular ring 8C made of spring steel is mounted floating in a slit-shaped space 19 in parallel with the axis X—X, provided in the support 4C and covers with play two studs 20 which extend through this space.

At rest, the ring 8C assumes an indeterminate position, for example bearing on the studs 20. When it comes up against the sleeve, it is centered in relation to the latter, and then the front stud causes it to flatten in its plane, as represented by dot-and-dash lines in FIG. 5. The upstream end of the ring then actuates a microswitch 11C carried by the support 4C.

Figure 4:
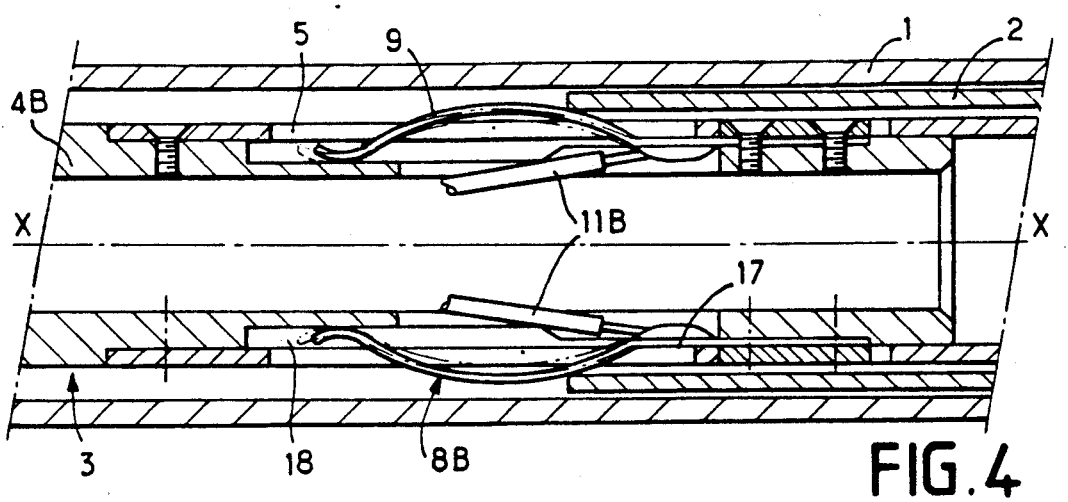
FIG. 4 shows in longitudinal section a third embodiment of the device according to the invention.

As in the case of FIG. 4, this embodiment prevents any spurious information attributable to unintended deformation of the wall of the tube 1.

The device according to the invention can be used for the accurate detection of sleeves, for the purpose of positioning tools, such as, for example, a laser welding pipe, a thermal treatment tube or an ultrasonic monitoring insert. It will be noted in this respect that in all the embodiments the device for detecting the sleeve has one or more orifices, via which the water necessary for conducting an ultrasonic check can be passed.

I claim:

1. Device for detecting the end of a sleeve arranged in a tube, said device comprising
    (a) a support adapted to be introduced concentrically into said tube;
    (b) a feeler mounted on said support for movement between a position of rest in which it projects radially beyond an inner wall of said sleeve, and a position retracted inwards in relation to said wall;
    (c) said feeler in said position of rest being located at a radial distance from an axis of said tube which is larger than an inner radius of said sleeve but smaller than an inner radius of said tube;
    (d) means for biasing said feeler elastically towards its position of rest; and
    (e) a sensor of the position of said feeler, said sensor being attached to said support.

2. Device according to claim 1, wherein, when in rest position, said feeler is set back relative to said inner wall of said tube.

3. Device according to claim 1, wherein said feeler is a convex elastic lamella having a first end fastened to said support and a second end moveable relative to said support.

4. Device according to claim 3, wherein said sensor is a proximity detector mounted on said support opposite said second end of said lamella.

5. Device according to claim 3, wherein said sensor is a strain gauge associated with said first end of said lamella.

6. Device according to claim 1, wherein said feeler is a lever oscillated towards its position of rest by a spring.

7. Device according to claim 1, wherein said support carries at least two feelers arranged in different radial planes.

8. Device according to claim 7, wherein said support carries at least two sensors associated with different feelers.

9. Tool holder for working in a tube having a sleeve, said tool holder being associated with a detection device comprising
  (a) a support fixed to said tool holder and adapted to be introduced concentrically into said tube;
  (b) a feeler mounted on said support for movement between a position of rest in which it projects radially beyond the inner wall of the sleeve, and a position retracted inwards in relation to said wall, said feeler in said position of rest being located at a radial distance from an axis of said tube which is larger than an inner radous of said sleeve but smaller than an inner radius of said tube;
  (c) means for biasing said feeler elastically towards said position of rest; and
  (d) a sensor of the position of said feeler, said sensor being attached to said support.

10. Device for detecting the end of a sleeve arranged in a tube, said device comprising
  (a) a support adapted to be introduced concentrically into said tube;
  (b) a feeler mounted on said support for movement between a position of rest in which it projects radially beyond an inner wall of said sleeve, and a position retracted inwards in relation to said wall, said feeler being an elastic ring mounted floating in a plane parallel with an axis of said tube and surrounding a stop;
  (c) said feeler in said position of rest being located at a radial distance from an axis of said tube which is larger than an inner radius of said sleeve but smaller than an inner radius of said tube;
  (d) means for biasing said feeler elastically towards its position of rest; and
  (e) a sensor of the position of said feeler, said sensor being attached to said support.

* * * * *